(12) United States Patent
Thibeault et al.

(10) Patent No.: US 8,576,705 B2
(45) Date of Patent: Nov. 5, 2013

(54) UPSTREAM CHANNEL BONDING PARTIAL SERVICE USING SPECTRUM MANAGEMENT

(75) Inventors: Brian K. Thibeault, Attleboro, MA (US); Michael J. Cooper, Augusta, GA (US); Marc L. Morrissette, Plainville, MA (US)

(73) Assignee: General Instrument Corporation, Horsham, PA (US)

( * ) Notice: Subject to any disclaimer, the term of this patent is extended or adjusted under 35 U.S.C. 154(b) by 182 days.

(21) Appl. No.: 13/300,101

(22) Filed: Nov. 18, 2011

(65) Prior Publication Data

US 2013/0128723 A1 May 23, 2013

(51) Int. Cl.
*H04L 12/26* (2006.01)

(52) U.S. Cl.
USPC .......................................................... 370/225

(58) Field of Classification Search
None
See application file for complete search history.

(56) References Cited

U.S. PATENT DOCUMENTS

| | | |
|---|---|---|
| 3,838,221 A | 9/1974 | Schmidt et al. |
| 4,245,342 A | 1/1981 | Entenman |
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan |
| 5,271,060 A | 12/1993 | Moran et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |
| 5,557,603 A | 9/1996 | Barlett et al. |
| 5,606,725 A | 2/1997 | Hart |
| 5,631,846 A | 5/1997 | Szurkowski |
| 5,694,437 A | 12/1997 | Yang et al. |
| 5,732,104 A | 3/1998 | Brown et al. |

(Continued)

FOREIGN PATENT DOCUMENTS

| | | |
|---|---|---|
| DE | 69631420 T2 | 12/2004 |
| EP | 0905998 A2 | 3/1999 |

(Continued)

OTHER PUBLICATIONS

PCT Search Report and Written Opinion, RE: Application #PCT/US2012/063485, Feb. 19, 2013.

(Continued)

*Primary Examiner* — Otis L Thompson, Jr.
(74) *Attorney, Agent, or Firm* — Stewart M. Wiener (57) ABSTRACT

A method and computing device receives data packets on an upstream bonding group in full service mode, where the upstream bonding group includes a set of channels and each channel has a transmission quality. The method detects that a select channel in the set of channels is impaired when the transmission quality of the select channel is below a threshold value, and transitions the receiving of the data packets from full service mode to partial service mode by disabling data grant scheduling on the select channel. The method monitors the select channel using a spectrum management method while the receiving of the data packets is in partial service mode. The method transitions the receiving of the data packets from partial service mode to full service mode when a result from the spectrum management method indicates that the select channel can transmit data packets error free.

22 Claims, 4 Drawing Sheets

(56) References Cited

U.S. PATENT DOCUMENTS

| | | |
|---|---|---|
| 5,790,523 A | 8/1998 | Ritchie et al. |
| 5,862,451 A | 1/1999 | Grau et al. |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al-Araji et al. |
| 6,556,562 B1 | 4/2003 | Bhagavath et al. |
| 6,556,660 B1 | 4/2003 | Li et al. |
| 6,559,756 B2 | 5/2003 | Al-Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,816,463 B2 | 11/2004 | Cooper et al. |
| 6,834,057 B1 * | 12/2004 | Rabenko et al. ............ 370/468 |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,999,408 B1 | 2/2006 | Gomez |
| 7,002,899 B2 | 2/2006 | Azenkot et al. |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,145,887 B1 * | 12/2006 | Akgun et al. ............ 370/321 |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,616,654 B2 | 11/2009 | Moran, III et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,693,090 B1 | 4/2010 | Kimpe |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,760,624 B1 | 7/2010 | Goodson et al. |
| 7,778,314 B2 | 8/2010 | Wajcer et al. |
| 7,787,557 B2 | 8/2010 | Kim et al. |
| 7,792,183 B2 | 9/2010 | Massey et al. |
| 7,856,049 B2 | 12/2010 | Currivan et al. |
| 7,876,697 B2 | 1/2011 | Thompson et al. |
| 7,953,144 B2 | 5/2011 | Allen et al. |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 | 10/2011 | Cummings |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0067944 A1 * | 4/2003 | Sala et al. ............ 370/474 |
| 2003/0101463 A1 | 5/2003 | Greene et al. |
| 2003/0108052 A1 | 6/2003 | Inoue et al. |
| 2003/0120819 A1 | 6/2003 | Abramson et al. |

(56) References Cited

U.S. PATENT DOCUMENTS

| | | |
|---|---|---|
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052356 A1 | 3/2004 | McKinzie et al. |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0030805 A1* | 2/2007 | Pantelias et al. ............... 370/235 |
| 2007/0058542 A1 | 3/2007 | Thibeault |
| 2007/0076592 A1 | 4/2007 | Thibeault |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1 | 9/2007 | Klimker et al. |
| 2007/0206625 A1 | 9/2007 | Maeda |
| 2007/0211618 A1* | 9/2007 | Cooper et al. ................. 370/208 |
| 2007/0223512 A1 | 9/2007 | Cooper et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0075157 A1 | 3/2008 | Allen et al. |
| 2008/0101210 A1 | 5/2008 | Thompson et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0249421 A1 | 10/2009 | Liu et al. |
| 2010/0083356 A1 | 4/2010 | Steckley et al. |
| 2010/0095360 A1 | 4/2010 | Pavlovski et al. |
| 2010/0154016 A1* | 6/2010 | Li et al. ........................ 725/111 |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0223650 A1 | 9/2010 | Millet et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0110415 A1 | 5/2011 | Cooper et al. |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |

FOREIGN PATENT DOCUMENTS

| | | |
|---|---|---|
| EP | 1235402 A2 | 8/2002 |
| EP | 1341335 A2 | 9/2003 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001044956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2009146426 A1 | 12/2009 |

OTHER PUBLICATIONS

Cable Television Laboratories, Inc., "A Simple Algorithm for Fault Localization Using Naming Convention and Micro-reflection Signature," Invention Disclosure 60193, 2 pages, Jun. 2008.

Cable Television Laboratories, Inc., "DOCSIS® Best Practices and Guidelines: Proactive Network Maintenance Using Preequalization," CM-GL-PNMP-V01-100415, Apr. 2010.

Cable Television Laboratories, Inc., "Pre-Equalization Based Proactive Network Maintenance Process Model for CMs Transmitting on Multiple Upstream Channels," Invention Disclosure 60203, 2 pages, May 2009.

Cable Television Laboratories, Inc., "Pre-Equalization based pro-active network maintenance process model", Invention Disclosure 60177, 2 pages, Jun. 2008.

Cable Television Laboratories, Inc., "DOCSIS® Best Practices and Guidelines: Proactive Network Maintenance Using Pre-equalization," CM-GL-PNMP-V02-110623, Jun. 2011.

Cable Television Laboratories, Inc., "Data-Over-Cable Service Interface Specifications: DOCSIS 2.0 Radio Frequency Interface Specification," CM-SP-RFIv2.0-106-040804, Apr. 2004.

L.A. Campos, et al., "Pre-equalization based Pro-active Network Maintenance Methodology", Cable Television Laboratories, Inc., presentation, 32 pages, 2008.

R.L. Howald, et al., "Customized Broadband—Analysis Techniques for Blended Multiplexes," NCTA Technical Papers, 2002.

R. Howald, "Access Networks Solutions: Introduction to S-CDMA," Presentation to Society of Cable Telecommunications Engineers (SCTE) South Florida Chapter, 2009.

(56) References Cited

OTHER PUBLICATIONS

R. Howald, "Upstream Snapshots & Indicators (2009)," Regional Samples, Presentation to Society of Cable Telecommunications Engineers (SCTE) South Florida Chapter, Jan. 2010.
R.L. Howald et al., "Characterizing and Aligning the HFC Return Path for Successful DOCSIS 3.0 Rollouts", SCTE Cable-Tec Expo, Oct. 2009.
R. Howald, et al., "DOCSIS 3.0 Upstream: Readiness & Qualification," SCTE Cable-Tec Expo, Oct. 2009.
R. Howald, et al., "The Grown-Up Potential of a Teenage PHY", NCTA Convention and Exposition, May 2012.
R. Howald, "DOCSIS 3.0 Upstream: Technology, RF Variables & Case Studies," Access Networks Solutions, 2009, presentation to Society of Cable Telecommunications Engineers (SCTE) South Florida Chapter, 23 pages, Jan. 2010.
R. Hranac, "Linear Distortions, Part 1," Communication Technology, Jul. 2005.
X. Liu, et al., "Variable Bit Rate Video Services in DOCSIS 3.0 Networks," NCTA Technical Papers, 2008.
Motorola, Inc., "White Paper: Expanding Bandwidth Using Advanced Spectrum Management," Sep. 25, 2003.
H. Newton, Newton's Telecom Dictionary, Flatiron Publishing, 9th ed., pp. 216 and 1023 (definitions of "carrier to noise ratio" and "signal to noise ratio"), Sep. 1995.
M. Patrick, et al., "Delivering Economical IP Video over DOCSIS by Bypassing the M-CMTS with DIBA," SCTE 2007 Emerging Technologies, NCTA Technical Papers, 2007.
A. Popper, et al., "An Advanced Receiver with Interference Cancellation for Broadband Cable Networks," International Zurich Seminar on Broadband Communications Access 2002, pp. 23-1 to 23-6, IEEE, 2002.
A. Popper, et al., "Ingress Noise Cancellation for the Upstream Channel in Broadband Cable Access Systems," International Conference on Communications 2002, vol. 3, pp. 1808-1812, IEEE, 2002.
S.U.H. Qureshi, "Adaptive Equalization," Proceedings of the IEEE, vol. 73, No. 9, pp. 1349-1387, Sep. 1985.
S. Ramakrishnan, "Scaling the DOCSIS Network for IPTV," SCTE Conference on Emerging Technologies, NCTA Cable Show, Apr. 2009.
Y.R. Shelke, "Knowledge Based Topology Discovery and Geo-localization", Thesis, Master of Science, Ohio State University, 2010.
R. Thompson, et al., "256-QAM for Upstream HFC," NCTA 2010 Spring Technical Forum Proceedings, pp. 142-152, May 2010.
R. Thompson, et al., "256-QAM for Upstream HFC Part Two", SCTE Cable-Tec Expo 2011, Technical Paper, Nov. 2011.
R. Thompson, et al., "Multiple Access Made Easy," SCTE Cable-Tec Expo 2011, Technical Paper, Nov. 2011.
R. Thompson, et al., "Optimizing Upstream Throughput Using Equalization Coefficient Analysis", National Cable & Telecommunications Association (NCTA) Technical Papers, Apr. 2009.
R. Thompson, et al., "Practical Considerations for Migrating the Network Toward All-Digital", Society of Cable Telecommunications Engineers (SCTE) Cable-Tec Expo, Oct. 2009.
R. Thompson, et al., "64-QAM, 6.4MHz Upstream Deployment Challenges," SCTE Canadian Summit, Toronto, Canada, Technical Paper, Mar. 2011.
L. Wolcott, "Modem Signal Usage and Fault Isolation," U.S. Appl. No. 61/301,835, filed Feb. 5, 2010.
F. Zhao, et al., "Techniques for minimizing error propagation in decision feedback detectors for recording channels," IEEE Transactions on Magnetics, vol. 37, No. 1, pp. 592-602, Jan. 2001.
B. Volpe and W. Miller, "Cable-Tec Expo 2011: Advanced Troubleshooting in a DOCSIS © 3.0 Plant", Nov. 14-17, 2011.
Cable Television Laboratories, Inc., "Data-Over-Cable Service Interface Specifications DOCSIS 3.0: MAC and Upper Layer Protocols Interface", CM-SP-MULPIv3.0-116-110623, Jun. 2011, section 8, pp. 242-266.

* cited by examiner

UPSTREAM CHANNEL BONDING PARTIAL SERVICE USING SPECTRUM MANAGEMENT

BACKGROUND

Data over cable service interface specification (DOCSIS) is an international telecommunications standard that permits the addition of high-speed data transfer to an existing cable television system. Cable television operators use DOCSIS 3.0 to provide two-way communication over their existing hybrid fiber-coaxial (HFC) infrastructure.

An HFC network is a broadband network that combines optical fiber and coaxial cable. The HFC network is a two-way communication network between a cable modem termination system (CMTS) and a cable modem. The CMTS is communication equipment typically located in a cable operator's headend facility. The CMTS collects and processes communication signals, distributes those signals to customer locations using downstream channels, and receives other communication signals from the customer locations on upstream channels. The cable modem is a communication device that receives the communication signals on the downstream channels from the CMTS, and transmits the other communication signals to the CMTS on the upstream channels. The cable modem may be a standalone device that connects to the Internet, or integrated with the set-top box.

Channel bonding is a DOCSIS 3.0 feature that enables a cable modem at a customer location to use multiple downstream channels, or multiple upstream channels, together at the same time. For example, a cable modem configured with four upstream channels can use DOCSIS 3.0 channel bonding to increase the throughput of the upstream communication with the CMTS. The cable modem distributes, or segments, the data packets among the four channels in an upstream bonding group and transmits the data packets to the CMTS in parallel, rather than in series. When the upstream bonding group operates in full service mode, the CMTS receives and reassembles the data packets on all four channels in the upstream bonding group. If there is a problem receiving data packets on a CMTS receiver, due to an upstream channel that is associated with the receiver being impaired or unavailable, the CMTS cannot properly reassemble the data packets for the upstream bonding group and data loss or throughput degradation will result. The detection of this problem will allow communication to continue between the CMTS and cable modem by transitioning the upstream bonding group to operate in partial service mode by disabling data grant scheduling on the faulty receiver/channel. The prior art relies on the cable modem to detect the need to transition to partial service mode, and notify the CMTS. For example, the prior art DOCSIS method relies on the cable modem to detect power transmission issues due to ranging outside of the dynamic range power window for the cable modem. However, a cable modem cannot detect the impairment of an upstream channel. The cable modem can only infer the impairment because a channel can be impaired even though ranging messages can still make it through, and by the absence of the RNG-RSP messages from the CMTS after cable modem ranging intervals. Detection by the cable modem is a process that is unreliable and may result in significant time delay in the detection process. Thus, the prior art methods for transitioning from partial service mode to full service mode will allow the transition to occur before the channel is available, or perform the transition incorrectly, thereby resulting in data loss and performance degradation.

There is a need for a method of transitioning channels in an upstream bonding group from partial service mode to full service mode that minimizes data loss and maximizes performance. The presently disclosed invention satisfies this demand.

SUMMARY

Aspects of the present invention provide a method and computing device that receives data packets on an upstream bonding group in full service mode, where the upstream bonding group includes a set of channels and each channel has a transmission quality. The method detects that a select channel in the set of channels is impaired when the transmission quality of the select channel is below a threshold value, and transitions the receiving of the data packets from full service mode to partial service mode by disabling data grant scheduling on the select channel. The method monitors the select channel using a spectrum management method while the receiving of the data packets is in partial service mode. The method transitions the receiving of the data packets from partial service mode to full service mode when a result from the spectrum management method indicates that the select channel can transmit data packets error free.

DETAILED DESCRIPTION

Figure 1:
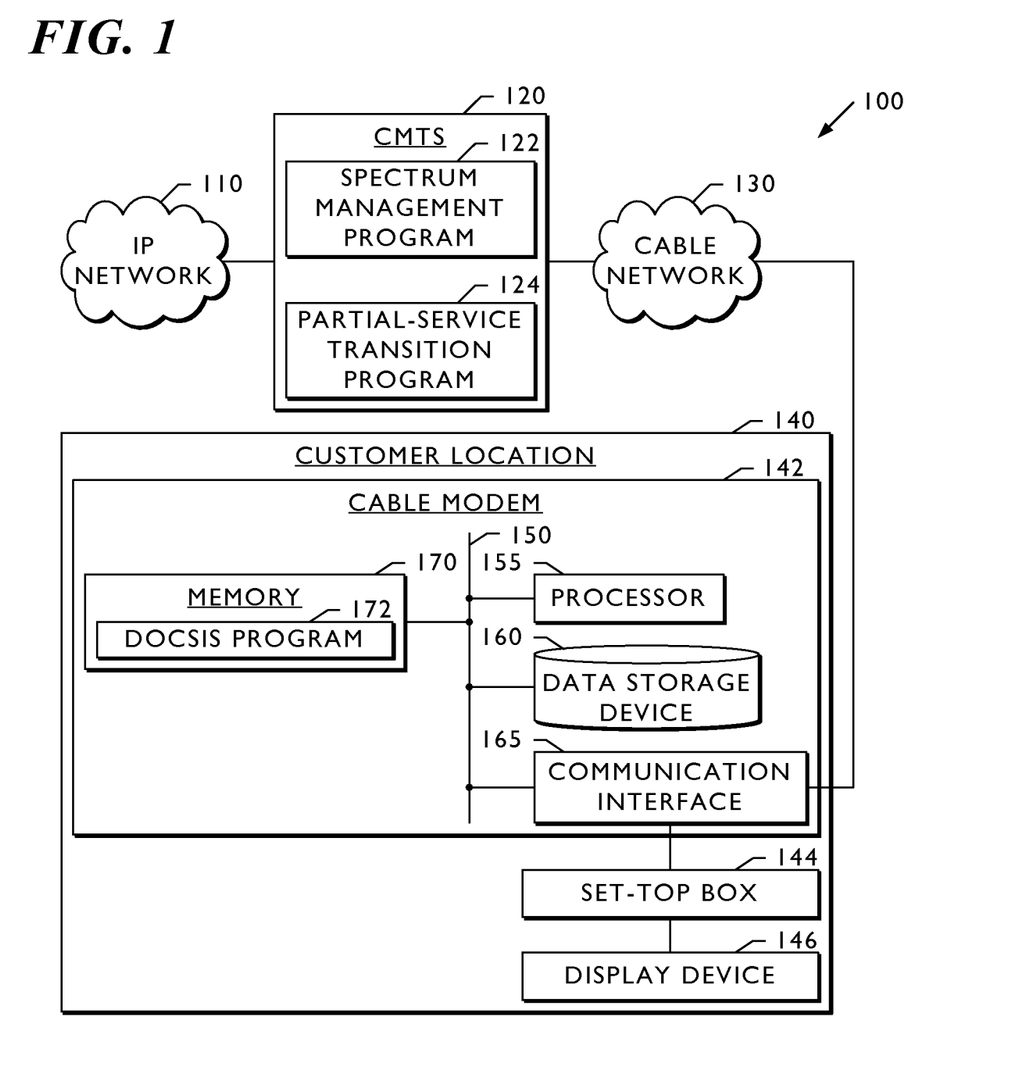
FIG. 1 is a block diagram that illustrates one embodiment of the hardware components of a system that performs the present invention.

FIG. 1 is a block diagram that illustrates one embodiment of the hardware components of a system that performs the present invention. A broadband network 100 includes an Internet protocol (IP) network 110, cable modem termination system (CMTS) 120, cable network 130, and customer location 140. The broadband network 100 shown in FIG. 1 may include any number of interconnected IP network 110, CMTS 120, cable network 130, and customer location 140 components.

The IP network 110 shown in FIG. 1, in one embodiment, is a public communication network or wide area network (WAN) that connects to the CMTS 120. The present invention also contemplates the use of comparable network architectures including a LAN, a personal area network (PAN) such as a Bluetooth network, a wireless LAN (e.g., a wireless-fidelity (Wi-Fi) network), peer-to-peer overlay network, and a virtual private network (VPN). The system contemplates comparable network architectures and protocols such as Ethernet and transmission control protocol.

The cable network 130 shown in FIG. 1, in one embodiment, is a hybrid fiber-coaxial (HFC) network. The cable network 130 is a data and video content network that provides two-way communication between the CMTS 120 and customer location 140.

The CMTS 120, in one embodiment, is communication equipment located in a cable operator's headend or hubsite that provides high-speed data services, such as cable Internet or voice over Internet protocol, to cable subscribers. The CMTS 120 shown in FIG. 1 is a computing device that provides the customer location 140 with various services and connections, including support for data over cable service interface specification (DOCSIS), spectrum management program 122, partial service transition program 124, and connections to the IP network 110 and cable network 130. The spectrum management program 122 is an implementation of a prior art spectrum management method that monitors channels in an upstream bonding group to determine whether those channels are clean enough to transmit data packets successfully, or impaired and not likely to transmit data packets successfully. The spectrum management program 122 and partial service transition program 124 together with the cable modem 142 perform the method of the present invention disclosed in the exemplary embodiments depicted in FIG. 2, FIG. 3, and FIG. 4. The connection to the IP network 110 enable the CMTS 120 to provide access to external services such as video servers, public switched telephone network voice, multimedia messages, and Internet data.

The customer location 140 shown in FIG. 1 is a customer's home, business, or another location where the customer accesses the cable service. In one embodiment, the customer location 140 includes a cable modem 142, set-top box 144, and display device 146. In other embodiments, the set-top box 144 is a digital television (DTV) Converter (DTC) or other customer-premises equipment (CPE), and the display device 146 is an Internet protocol television (IPTV) or analog television. In yet another embodiment, the set-top box 144 includes the cable modem 142.

The cable modem 142 shown in FIG. 1, in one embodiment, is a general-purpose computing device that performs the present invention together with the spectrum management program 122 and partial service transition program 124 on the CMTS 120. A bus 150 is a communication medium connecting a processor 155, data storage device 160 (such as a serial ATA (SATA) hard disk drive, optical drive, small computer system interface (SCSI) disk, flash memory, or the like), communication interface 165, and memory 170 (such as random access memory (RAM), dynamic RAM (DRAM), non-volatile computer memory, flash memory, or the like). The communication interface 165 connects the cable modem 142 to the cable network 130 and allows for two-way communication of data and content. In one embodiment, the set-top box 144 includes the cable modem 142 implemented as an application-specific integrated circuit (ASIC).

The processor 155 performs the disclosed methods by executing sequences of operational instructions that comprise each computer program resident in, or operative on, the memory 170. The reader should understand that the memory 170 may include operating system, administrative, and database programs that support the programs disclosed in this application. In one embodiment, the configuration of the memory 170 of the cable modem 142 includes a DOCSIS program 172. The DOCSIS program 172 is an implementation of DOCSIS 3.0. The DOCSIS program 172 together with the spectrum management program 122 and partial service transition program 124 perform the method of the present invention disclosed in the exemplary embodiments depicted in FIG. 2, FIG. 3, and FIG. 4. When the processor 155 performs the disclosed method, it stores intermediate results in the memory 170 or data storage device 160. In another embodiment, the memory 170 may swap these programs, or portions thereof, in and out of the memory 170 as needed, and thus may include fewer than all of these programs at any one time.

Figure 2:
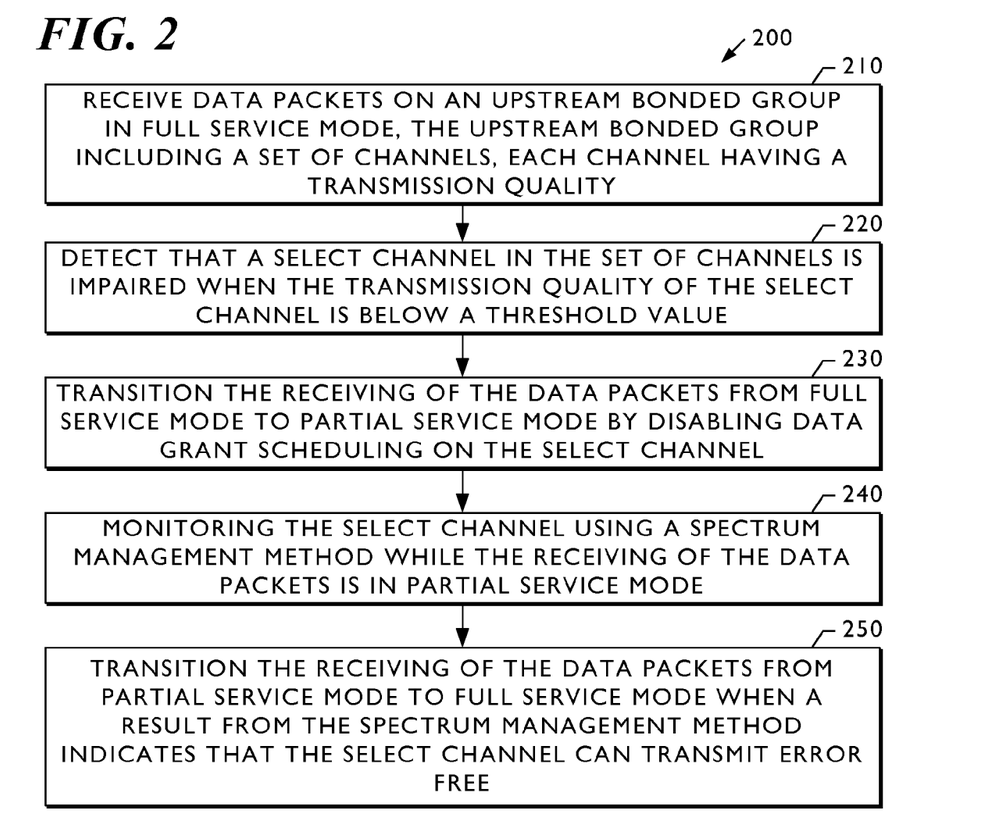
FIG. 2 is a flow diagram that illustrates a method of transitioning channels in an upstream bonding group from partial service mode to full service mode according to one embodiment of the present invention.

FIG. 2 is a flow diagram that illustrates a method of transitioning channels in an upstream bonding group from partial service mode to full service mode according to one embodiment of the present invention. The process 200 shown in FIG. 2 begins when the CMTS 120 receives data packets from the cable modem 142 on an upstream bonding group that is operating in full service mode, and that includes a set of channels (step 210). The DOCSIS program 172 running on the cable modem 142 and the CMTS 120 communicate using upstream channel bonding. For example, the cable modem 142 uses four bonded upstream channels in full service mode by distributing the data packets among the four upstream channels, and transmitting those data packets in parallel to the CMTS 120. When the CMTS 120 receives the data packets, it reassembles the data packets for subsequent transmission to the Internet or another destination.

The cable operator configures the spectrum management program 122 on the CMTS 120 to monitor each channel in the upstream bonding group. When the transmission quality of one of those channels drops below a threshold value, the spectrum management program 122 determines that the channel is impaired (step 220). Thus, the upstream bonding group is running in partial service mode when one or more of the receivers/channels in the group are impaired, and in full service mode when the receivers/channels in the group are all running normally. The partial service transition program 124 transitions the receiving of data packets on the upstream bonding group from full service mode to partial service mode by disabling data grant scheduling on the channel that is impaired (step 230). In one embodiment, the cable operator can configure the threshold value for the modulation type of the modulation profile that the channel is using to detect whether an upstream channel is impaired. In another embodiment, the threshold value is set to a default value. In yet another embodiment, the spectrum management program 122 will first attempt to correct the impairment by either changing the upstream frequency of the impaired channel or dropping the impaired channel to a lower modulation profile. If these attempts to improve the transmission quality of the impaired channel are not successful, the partial service transition program 124 will transition the receiving of data packets on the upstream bonding group from full service mode to partial service mode. Even though a transition from full service mode to partial service mode will reduce the throughput for the cable modem 142, it will avoid the loss, or need to retransmit, any data packets. In yet another embodiment, the spectrum management program 122 can detect a potential loss of data, transition from full service mode to partial service mode, remedy the situation, and avoid the loss of any data.

The spectrum management program 122 monitors the transmission quality of the channel that is impaired using a spectrum management method while the receiving of data packets on the upstream bonding group is in partial service mode (step 240). Once the spectrum management program 122 determines that the impaired channel is clean, the partial service transition program 124 transitions the receiving of data packets on the upstream bonding group from partial service mode to full service mode (step 250).

The spectrum management program 122 attempts to keep the channels in the upstream bonding group running at optimal efficiency at all times. The spectrum management program 122 uses its existing frequency and modulation agility features before the upstream bonding group transitions from full service mode to partial service mode, and transitions into partial service mode only as a last step. In one embodiment, the cable operator configures the spectrum management program 122 specifically for partial service mode, thereby allowing the cable operator to bypass the implementation of frequency or modulation agility. If the cable operator bypasses the implementation of frequency or modulation agility, the spectrum management program 122 will transition the upstream bonding group directly to partial service mode when it detects an impaired channel and recovers when the channel is no longer impaired. When the upstream bonding group goes into partial service mode, it not only has to recover as quickly as possible, but also has to do it correctly. If the CMTS 120 allows the upstream bonding group to come out of partial service mode prematurely, or incorrectly, and allows the cable modem 142 to start using that upstream channel again before it is clean enough to use without error, the situation starts all over again and becomes untrustworthy and unreliable.

Figure 3:
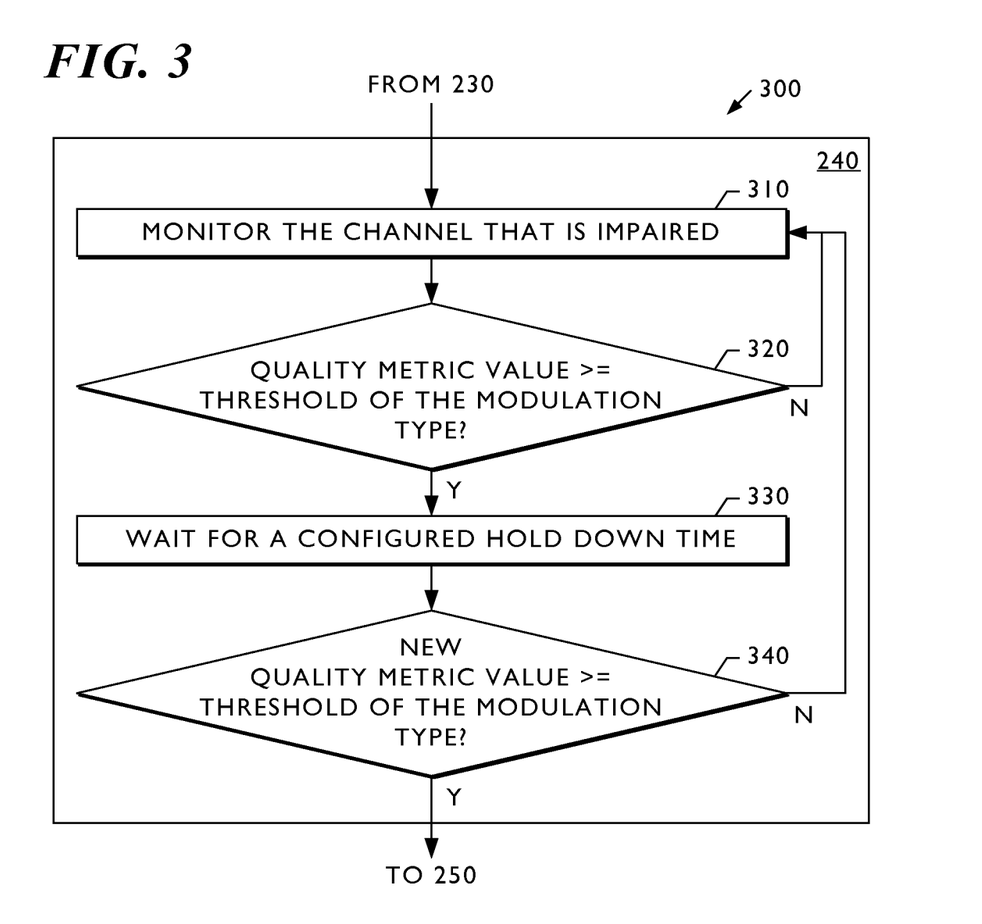
FIG. 3 is a flow diagram that illustrates a method to determine when to recover from upstream channel bonding partial service mode according to one embodiment of the present invention.

FIG. 3 is a flow diagram that illustrates a method to determine when to recover from upstream channel bonding partial service mode according to one embodiment of the present invention. FIG. 3 is one embodiment of a spectrum management method that the process 200 shown in FIG. 2 uses to monitor the transmission quality of the channel that is impaired to determine when to transition the receiving of data packets on the upstream bonding group from partial service mode to full service mode (step 240). The process 300 shown in FIG. 3 begins, when the upstream bonding group is in partial service mode, with the spectrum management program 122 monitoring the upstream channel that is impaired (step 310). In one embodiment, the cable operator configures threshold values for a quality metric specifically to handle a partial service mode situation for the modulation type. In another embodiment, instead of configuring the threshold values, the cable operator may choose to use the existing spectrum management threshold values. In one embodiment, the quality metric is a digital modulation quality metric, such as the modulation error ratio (MER). In another embodiment, the quality metric is a power-based signal quality metric, such as the signal-to-noise ratio (SNR or S/N), or the carrier-to-noise ratio (CNR or C/N), that is, the ratio of total carrier power to noise power integrated over the defined channel bandwidth. The CMTS 120 periodically compares an observed upstream channel quality metric value to the threshold of the modulation type (step 320) to determine whether the transmission quality of the channel that is impaired will allow for error free transmission of data packets. If the observed upstream channel quality metric value does not meet or exceed the threshold of the modulation type (step 320, N branch), the process 300 continues monitoring the channel that is impaired (step 310). If the observed upstream channel quality metric value meets or exceeds the threshold of the modulation type (step 320, Y branch), the process 300 waits for a configured hold down time (step 330). In one embodiment, the cable operator configures the hold down time. Upon expiration of the hold down time, the spectrum management program 122 compares a new observed upstream channel quality metric value to the threshold of the modulation type (step 340) to determine whether the transmission quality of the channel that is impaired will allow for error free transmission of data packets. If the new observed upstream channel quality metric value does not meet or exceed the threshold of the modulation type (step 340, N branch), the process 300 continues monitoring the channel that is impaired (step 310). If the new observed upstream channel quality metric value meets or exceeds the threshold of the modulation type (step 340, Y branch), the process 300 returns to the process 200 shown in FIG. 2 to transition the receiving of data packets from partial service mode to full service mode (step 250). In another embodiment, to monitor the channel that is impaired (step 310), the spectrum management program 122 examines the packet errors to determine when the transmission quality of the channel that was impaired has improved.

While in partial service mode, the spectrum management program 122 monitors the impaired channel by observing ranging requests or keep alive messages from the cable modem 142. Based on either the quality metric value of a particular modem, or the quality metric value of the whole channel, and the configuration chosen by the cable operator, the spectrum management program 122 determines whether the channel is clean enough to pass data packets successfully. The modulation mode associated with the channel determines which threshold the spectrum management program 122 uses to determine whether the channel is clean enough to pass data packets. The modulation type of the channel means the modulation mode of the long, or advanced long, data grants. The cable modem 142 and CMTS 120 can transmit and receive data packets at 8 quadrature amplitude modulation (QAM), 16 QAM, 32 QAM, 64 QAM, or even higher modulation modes. In other embodiments, the implementation of the modulation type could also use other data grants such as short or voice grants.

Figure 4:
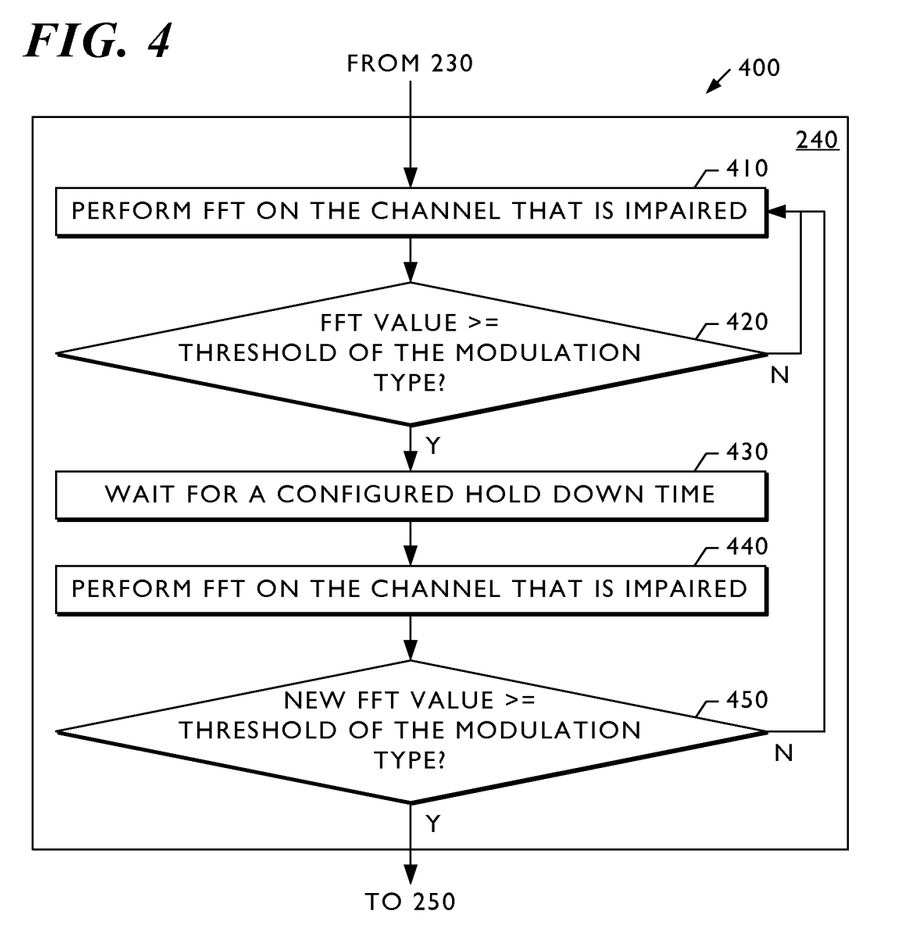
FIG. 4 is a flow diagram that illustrates a method to determine when to recover from upstream channel bonding partial service mode according to one embodiment of the present invention.

FIG. 4 is a flow diagram that illustrates a method to determine when to recover from upstream channel bonding partial service mode according to one embodiment of the present invention. FIG. 4 is one embodiment of a spectrum management method that the process 200 shown in FIG. 2 uses to monitor the transmission quality of the channel that is impaired to determine when to transition the receiving of data packets on the upstream bonding group from partial service mode to full service mode (step 240). The process 400 shown in FIG. 4 begins, when the upstream bonding group is in partial service mode, with the spectrum management program 122 periodically performing a fast Fourier transform (FFT) on the upstream channel that is impaired (step 410). In one embodiment, the cable operator configures a separate set of FFT values in case there are no modems or communications devices on an upstream channel. In another embodiment, the cable operator may choose to use the existing spectrum management thresholds. The CMTS 120 periodically compares an observed upstream channel FFT value to the threshold of the modulation type (step 420) to determine whether the transmission quality of the channel that is impaired will allow for error free transmission of data packets. If the observed upstream channel FFT value does not meet or exceed the threshold of the modulation type (step 420, N branch), the process 400 continues periodically performing an FFT on the channel that is impaired (step 410). If the observed upstream channel FFT value meets or exceeds the threshold of the modulation type (step 420, Y branch), the process 400 waits for a configured hold down time (step 430). In one embodiment, the cable operator configures the hold down time. Upon expiration of the hold down time, the spectrum management program 122 performs an FFT on the channel that is impaired (step 440), and compares a new observed upstream channel FFT value to the threshold of the modulation type (step 450) to determine whether the transmission quality of the channel that is impaired will allow for error free transmission of data packets. If the new observed upstream channel FFT value does not meet or exceed the threshold of the modulation type (step 450, N branch), the process 400 continues periodically performing an FFT on the channel that is impaired (step 410). If the new observed upstream channel FFT value meets or exceeds the threshold of the modulation type (step 450, Y branch), the process 400 returns to the process 200 shown in FIG. 2 transition the receiving of data packets from partial service mode to full service mode (step 250).

The availability of a separate set of quality metric and FFT threshold values is an advantage because the existing threshold of the modulation type may not be desirable for detecting when the quality of the impaired channel is good enough to avoid dropping data packets during transmission. The implementation of the FFT thresholds with no modems is an advantage over prior art systems that rely on the DOCSIS specification and cable modem ranging to determine whether to transition from partial service mode to full service mode. For example, when a CMTS is using four bonded channels with one channel in the "down" mode, when the CMTS brings the channel to the "up" mode, but it is not yet using any modems, the CMTS still needs to determine whether the quality of the channel is good enough to transmit data packets error free.

One advantage of the present invention over the prior art is the avoidance of transitioning from partial service mode to full service mode too early, thereby causing the cable modem to return back to partial service mode and creating a ping-pong effect. For example, prior art solutions that utilize the DOCSIS method may transition from partial service mode to full service mode because the channel is good enough to pass ranging messages in quadrature phase-shift keying (QPSK), but the channel is not able to pass data or voice packets. When these prior art solutions transition from partial service mode to full service mode under these conditions, the cable modem will not be able to reassemble packets and will transition back into partial service mode again. Furthermore, since an impaired channel impacts all modems that are attempting to operate on the channel, detection of the impaired channel by the CMTS, and subsequent mitigation, provides significant performance advantages rather than waiting for each modem to detect the problem and report it to the CMTS.

Another advantage of bringing impaired channels back online quickly is to improve customer service. Since a cable operator typically offers different tiers of service where the customer pays for the use of each upstream channel, if the customer wants faster throughput they may pay for four channels and expect all four to be transmitting data at all times. Thus, if the cable operator only has three or two channels working properly, the customer may notice that the upstream data transmission has degraded.

Although the disclosed embodiments describe a fully functioning method and computing device that uses a spectrum management method to determine when upstream bonded channels can recover from partial service mode, the reader should understand that other equivalent embodiments exist. Since numerous modifications and variations will occur to those reviewing this disclosure, the method and computing device that uses a spectrum management method to determine when upstream bonded channels can recover from partial service mode is not limited to the exact construction and operation illustrated and disclosed. Accordingly, this disclosure intends all suitable modifications and equivalents to fall within the scope of the claims.

We claim:

1. A method, comprising:
   receiving data packets on an upstream bonding group in full service mode, the upstream bonding group including a set of channels, each channel having a transmission quality;
   detecting that a select channel in the set of channels is impaired when the transmission quality of the select channel is below a threshold value;
   transitioning the receiving of the data packets from full service mode to partial service mode by disabling data grant scheduling on the select channel;
   monitoring the select channel using a spectrum management method while the receiving of the data packets is in partial service mode; and
   transitioning the receiving of the data packets from partial service mode to full service mode when a result from the spectrum management method indicates that the select channel can transmit data packets error free.

2. The method of claim 1, wherein the receiving of the data packets is in a cable modem termination system (CMTS), and from a cable modem.

3. The method of claim 1, wherein the detecting that the select channel in the set of channels is impaired further comprises:
   obtaining a result from the spectrum management method for the select channel; and
   comparing the result from the spectrum management method to the threshold value.

4. The method of claim 1, wherein the transitioning of the receiving of the data packets from full service mode to partial service mode further comprises:
   attempting to correct the select channel by changing an upstream frequency of the select channel.

5. The method of claim 1, wherein the transitioning of the receiving of the data packets from full service mode to partial service mode further comprises:
   attempting to correct the select channel by dropping the select channel to a lower modulation mode.

6. The method of claim 1, wherein the monitoring of the select channel further comprises:
   obtaining a value from a quality metric for the select channel, where the value is the result from the spectrum management method; and
   comparing the value from the quality metric to the threshold value,
   wherein the select channel can transmit data packets error free when the value from the quality metric meets or exceeds the threshold value.

7. The method of claim 6, wherein the quality metric includes at least one of modulation error ratio (MER), signal-to-noise ratio (SNR), and carrier-to-noise ratio (CNR).

8. The method of claim 6, further comprising:
   waiting for a hold down time;
   obtaining a new value from the quality metric after the hold down time expires; and
   comparing the new value from the quality metric to the threshold value,
   wherein the select channel can transmit data packets error free when the value from the quality metric and the new value from the quality metric meet or exceed the threshold value.

9. The method of claim 1, wherein the monitoring of the select channel further comprises:
   obtaining a value from a fast Fourier transform (FFT) for the select channel, where the value is the result from the spectrum management method; and
   comparing the value from the FFT to the threshold value,
   wherein the select channel can transmit data packets error free when the value from the FFT meets or exceeds the threshold value.

10. The method of claim 9, further comprising:
waiting for a hold down time;
obtaining a new value from the FFT after the hold down time expires; and
comparing the new value from the FFT to the threshold value,
wherein the select channel can transmit data packets error free when the value from the FFT and the new value from the FFT meet or exceed the threshold value.

11. The method of claim 1, wherein the transitioning of the receiving of the data packets from partial service mode to full service mode further comprises:
scheduling data packets on the select channel.

12. A computing device, comprising:
a memory device resident in the computing device; and
a processor disposed in communication with the memory device, the processor configured to:
receive data packets on an upstream bonding group in full service mode, the upstream bonding group including a set of channels, each channel having a transmission quality;
detect that a select channel in the set of channels is impaired when the transmission quality of the select channel is below a threshold value;
transition the receiving of the data packets from full service mode to partial service mode by disabling data grant scheduling on the select channel;
monitor the select channel using a spectrum management method while the receiving of the data packets is in partial service mode; and
transition the receiving of the data packets from partial service mode to full service mode when a result from the spectrum management method indicates that the select channel can transmit data packets error free.

13. The computing device of claim 12, wherein to detect that the select channel in the set of channels is impaired, the processor is further configured to:
obtain a result from the spectrum management method for the select channel; and
compare the result from the spectrum management method to the threshold value.

14. The computing device of claim 12, wherein to transition the receiving of the data packets from full service mode to partial service mode, the processor is further configured to:
attempt to correct the select channel by changing an upstream frequency of the select channel.

15. The computing device of claim 12, wherein to transition the receiving of the data packets from full service mode to partial service mode, the processor is further configured to:
attempt to correct the select channel by dropping the select channel to a lower modulation mode.

16. The computing device of claim 12, wherein to monitor the select channel, the processor is further configured to:
obtain a value from a quality metric for the select channel, where the value is the result from the spectrum management method; and
compare the value from the quality metric to the threshold value,
wherein the select channel can transmit data packets error free when the value from the quality metric meets or exceeds the threshold value.

17. The computing device of claim 16, wherein the quality metric includes at least one of modulation error ratio (MER), signal-to-noise ratio (SNR), and carrier-to-noise ratio (CNR).

18. The computing device of claim 16, wherein the processor is further configured to:
wait for a hold down time;
obtain a new value from the quality metric after the hold down time expires; and
compare the new value from the quality metric to the threshold value,
wherein the select channel can transmit data packets error free when the value from the quality metric and the new value from the quality metric meet or exceed the threshold value.

19. The computing device of claim 12, wherein to monitor the select channel, the processor is further configured to:
obtain a value from a fast Fourier transform (FFT) for the select channel, where the value is the result from the spectrum management method; and
compare the value from the FFT to the threshold value,
wherein the select channel can transmit data packets error free when the value from the FFT meets or exceeds the threshold value.

20. The computing device of claim 19, wherein the processor is further configured to:
wait for a hold down time;
obtain a new value from the FFT after the hold down time expires; and
compare the new value from the FFT to the threshold value,
wherein the select channel can transmit data packets error free when the value from the FFT and the new value from the FFT meet or exceed the threshold value.

21. The computing device of claim 12, wherein to transition the receiving of the data packets from partial service mode to full service mode, the processor is further configured to:
schedule data packets on the select channel.

22. A non-transitory computer-readable medium, comprising computer-executable instructions that, when executed on a computing device, perform steps of:
receiving data packets on an upstream bonding group in full service mode, the upstream bonding group including a set of channels, each channel having a transmission quality;
detecting that a select channel in the set of channels is impaired when the transmission quality of the select channel is below a threshold value;
transitioning the receiving of the data packets from full service mode to partial service mode by disabling data grant scheduling on the select channel;
monitoring the select channel using a spectrum management method while the receiving of the data packets is in partial service mode; and
transitioning the receiving of the data packets from partial service mode to full service mode when a result from the spectrum management method indicates that the select channel can transmit data packets error free.

* * * * *